(12) United States Patent
Luo et al.

(10) Patent No.: US 11,196,822 B2
(45) Date of Patent: Dec. 7, 2021

(54) SERVICE ACCELERATION METHOD, SYSTEM, APPARATUS, AND SERVER IN NFV SYSTEM

(71) Applicant: HUAWEI TECHNOLOGIES CO., LTD., Shenzhen (CN)

(72) Inventors: Donglei Luo, Shenzhen (CN); Yong Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 296 days.

(21) Appl. No.: 16/413,569

(22) Filed: May 15, 2019

(65) Prior Publication Data

US 2019/0281123 A1 Sep. 12, 2019

Related U.S. Application Data

(63) Continuation of application No. PCT/CN2017/094756, filed on Jul. 27, 2017.

(30) Foreign Application Priority Data

Nov. 15, 2016 (CN) .......................... 201611006005.0

(51) Int. Cl.
H04L 29/08 (2006.01)
G06F 9/455 (2018.01)
H04L 12/24 (2006.01)

(52) U.S. Cl.
CPC .............. *H04L 67/16* (2013.01); *G06F 9/455* (2013.01); *G06F 9/45558* (2013.01);
(Continued)

(58) Field of Classification Search
CPC ........... G06F 2009/45595; G06F 9/455; G06F 9/45558; H04L 29/08; H04L 41/5054; H04L 41/5096; H04L 67/16; H04L 67/34
See application file for complete search history.

(56) References Cited

U.S. PATENT DOCUMENTS 9,483,291 B1  11/2016  Chen et al.
2011/0238954 A1*  9/2011  Naito .................. G06F 15/7867
                                                  712/220
(Continued)

FOREIGN PATENT DOCUMENTS

CN   104951353 A   9/2015
CN   105979007 A   9/2016
(Continued)

*Primary Examiner* — Jorge A Chu Joy-Davila
(74) *Attorney, Agent, or Firm* — Maier & Maier, PLLC

(57) ABSTRACT

Embodiments provide a service acceleration method, system, apparatus, and server in an NFV system. For achieving these, a programmable package determining entity in the NFV system can determine a target service function that needs to be accelerated. A target programmable package corresponding to the target service function that needs to be accelerated can be obtained and the target programmable package to an acceleration engine in a network functions virtualization infrastructure (NFVI) can be sent. The acceleration engine runs the target programmable package to accelerate the target service function that needs to be accelerated. A programmable package of the acceleration engine can thus be dynamically replaced, and a service diversity requirement can be met, thereby improving scalability of a service acceleration function in the NFV system.

16 Claims, 8 Drawing Sheets

(52) U.S. Cl.
CPC .......... *H04L 29/08* (2013.01); *H04L 41/5054* (2013.01); *H04L 67/34* (2013.01); *G06F 2009/45595* (2013.01); *H04L 41/5096* (2013.01)

(56) References Cited

U.S. PATENT DOCUMENTS

| | | |
|---|---|---|
| 2015/0339130 A1* | 11/2015 | Kruglick ............ G06F 11/3024 713/100 |
| 2016/0321094 A1 | 11/2016 | Rabi et al. |
| 2017/0012823 A1 | 1/2017 | Zhu et al. |
| 2017/0039089 A1 | 2/2017 | Xia et al. |
| 2017/0371692 A1* | 12/2017 | Connolly ............ G06F 9/45558 |
| 2019/0129874 A1 | 5/2019 | Huang et al. |

FOREIGN PATENT DOCUMENTS

| | | |
|---|---|---|
| CN | 106095719 A | 11/2016 |
| EP | 3115892 A1 | 1/2017 |
| WO | 2015139310 A1 | 9/2015 |
| WO | 2015143983 A1 | 10/2015 |

\* cited by examiner

SERVICE ACCELERATION METHOD, SYSTEM, APPARATUS, AND SERVER IN NFV SYSTEM

CROSS-REFERENCE TO RELATED APPLICATIONS

This application is a continuation of International Application No. PCT/CN2017/094756, filed on Jul. 27, 2017, which claims priority to Chinese Patent Application No. 201611006005.0, filed on Nov. 15, 2016, The disclosures of the aforementioned applications are hereby incorporated by reference in their entireties.

TECHNICAL FIELD

The present invention relates to the communications field, and in particular, to a service acceleration method, system, apparatus, and server in an NFV system.

BACKGROUND

According to the Virtual Network Function (NFV) organization standard, based on commodity off-the-shelf (COTS) of a universal server platform, a communications network implements cloud deployment of a communications network element device by using a cloud IT technology (such as virtualization), implements dynamic allocation and use of hardware resources, and meets a requirement for a rapid service deployment capability of an operator.

A central processor unit (CPU) used by a general-purpose server has a relatively poor processing capability in network data processing and complex algorithm operation and has relatively low performance. To offset the disadvantage, an acceleration device (such as an FPGA) needs to be used to assist in acceleration processing of these services, so as to further improve service processing performance and reduce energy consumption. The acceleration device may be deployed in a distributed manner to implement flexible distribution and on-demand allocation of acceleration resources.

When a service of a service type needs to be accelerated, an acceleration engine runs a programmable package to perform service acceleration on the service of this service type, and the executed programmable package is a fixed programmable package pre-installed in the acceleration engine.

The communications device needs to accelerate various services, and the services are continuously evolved and expanded based on an actual performance requirement. However, because the programmable package is a fixed programmable package pre-installed in the acceleration engine, the programmable package cannot be extended, and a scalability requirement brought by service diversity cannot be met.

SUMMARY

Embodiments of the present invention provide a service acceleration method, system, apparatus, and server in an NFV system, so as to dynamically replace a programmable package of an acceleration engine, and improve scalability of a service acceleration function in the NFV system.

According to a first aspect, an embodiment of the present invention provides a service acceleration method in a network functions virtualization NFV system, and the method includes:

determining, by a programmable package determining entity in the NFV system, a target service function that needs to be accelerated; obtaining a target programmable package corresponding to the target service function; sending the target programmable package to an acceleration engine in a network functions virtualization infrastructure NFVI; and running, by the acceleration engine, the target programmable package to accelerate the target service function that needs to be accelerated.

In this embodiment of the present invention, a programmable package used for service acceleration is not a fixed programmable package pre-installed in the acceleration engine, but is a programmable package dynamically determined based on a service function that needs to be accelerated currently. Therefore, a programmable package of the acceleration engine can be dynamically replaced, and service diversity can be satisfied, thereby improving scalability of a service acceleration function in the NFV system.

With reference to the first aspect, in a first possible implementation of the first aspect, the programmable package determining entity includes a VNF and a management and orchestration MANO; the MANO stores a programmable package, and a correspondence between a service function and a programmable package name; the determining, by a programmable package determining entity, a target service function that needs to be accelerated is specifically: determining, by the VNF, the target service function that needs to be accelerated; the obtaining, by a programmable package determining entity, a target programmable package corresponding to the target service function is specifically: sending, by the VNF, a service acceleration request to the MANO, where the service acceleration request indicates the target service function that needs to be accelerated; and determining, by the MANO from the correspondence between a service function and a programmable package name, a target programmable package name corresponding to the target service function, and then obtaining the target programmable package corresponding to the target programmable package name from the stored programmable package; and the sending, by a programmable package determining entity, the target programmable package to an acceleration engine in an NFVI is specifically: sending, by the MANO, the target programmable package to the acceleration engine in the NFVI.

In this possible implementation, the programmable package determining entity is the VNF and the MANO. The MANO controls a programmable capability of the acceleration engine, and may dynamically select a programmable package based on a service that needs to be accelerated, thereby satisfying service diversity and improving scalability of a service acceleration function in the NFV system.

With reference to the first possible implementation of the first aspect, in a second possible implementation of the first aspect, the MANO stores a correspondence between the programmable package and an acceleration engine partition number; the method further includes: determining, by the MANO from the correspondence between the programmable package and an acceleration engine partition number, a target partition corresponding to the target programmable package, and sending the target partition to the acceleration engine in the NFVI; and the running, by the acceleration engine, the target programmable package is specifically: running, by the acceleration engine, the target programmable package in the target partition.

Therefore, in a process in which the MANO controls the programmable capability of the acceleration engine, the MANO may further dynamically select a corresponding acceleration engine partition based on a programmable package, and the acceleration engine dynamically loads different programmable packages in different partitions, so that there is no coupling relationship between various service acceleration capabilities, and a service acceleration capability is deployed and upgraded independently.

With reference to the first aspect, in a third possible implementation of the first aspect, the programmable package determining entity includes a VNF and a MANO; the VNF stores a programmable package, and a correspondence between a service function and a programmable package name; the determining, by a programmable package determining entity, a target service function that needs to be accelerated is specifically: determining, by the VNF, the target service function that needs to be accelerated; the obtaining, by a programmable package determining entity, a target programmable package corresponding to the target service function is specifically: determining, by the VNF from the correspondence between a service function and a programmable package name, a target programmable package name corresponding to the target service function, and then obtaining the target programmable package corresponding to the target programmable package name from the stored programmable package; and the sending, by a programmable package determining entity, the target programmable package to an acceleration engine in an NFVI is specifically: sending, by the VNF, the target programmable package to the MANO; and sending, by the MANO, the target programmable package to the acceleration engine in the NFVI.

In this possible implementation, the VNF and the MANO collaboratively control a programmable capability of the acceleration engine, and may dynamically select a programmable package based on a service that needs to be accelerated, thereby satisfying service diversity and improving scalability of a service acceleration function in the NFV system.

With reference to the third possible implementation of the first aspect, in a fourth possible implementation of the first aspect, the MANO stores a correspondence between the programmable package and an acceleration engine partition number; the method further includes: determining, by the MANO from the correspondence between the programmable package and an acceleration engine partition number, a target partition corresponding to the target programmable package, and sending the target partition to the acceleration engine in the NFVI; and the running, by the acceleration engine, the target programmable package is specifically: running, by the acceleration engine, the target programmable package in the target partition.

Therefore, in a process in which the VNF and the MANO collaboratively control the programmable capability of the acceleration engine, the MANO may further dynamically select a corresponding acceleration engine partition based on a programmable package, and the acceleration engine dynamically loads different programmable packages in different partitions, so that there is no coupling relationship between various service acceleration capabilities, and a service acceleration capability is deployed and upgraded independently.

With reference to the first aspect, in a fifth possible implementation of the first aspect, the programmable package determining entity includes a VNF; the VNF stores a programmable package, and a correspondence between a service function and a programmable package name; the determining, by a programmable package determining entity, a target service function that needs to be accelerated is specifically: determining, by the VNF, the target service function that needs to be accelerated; the obtaining, by a programmable package determining entity, a target programmable package corresponding to the target service function is specifically: determining, by the VNF from the correspondence between a service function and a programmable package name, a target programmable package name corresponding to the target service function, and then obtaining the target programmable package corresponding to the target programmable package name from the stored programmable package; and the sending, by a programmable package determining entity, the target programmable package to an acceleration engine in an NFVI is specifically: sending, by the VNF, the target programmable package to the acceleration engine in the NFVI.

In this possible implementation, the VNF controls a programmable capability of the acceleration engine, and may dynamically select a programmable package based on a service that needs to be accelerated, thereby satisfying service diversity and improving scalability of a service acceleration function in the NFV system.

According to a second aspect, an embodiment of the present invention provides a service acceleration method in a network functions virtualization NFV system, where the NFV system includes a VNF, a management and orchestration MANO, and a network functions virtualization infrastructure NFVI, and the method includes:

receiving, by the MANO, a service acceleration request sent by the VNF, where the service acceleration request indicates a target service function that needs to be accelerated; obtaining, by the MANO, a target programmable package corresponding to the target service function; and sending, by the MANO, the target programmable package to an acceleration engine in the NFVI, where the target programmable package is used by the acceleration engine to accelerate the target service function that needs to be accelerated.

With reference to the second aspect, in a first possible implementation of the second aspect, the MANO stores a programmable package, and a correspondence between a service function and a programmable package name, and the obtaining, by the MANO, a target programmable package corresponding to the target service function includes: determining, by the MANO from the correspondence between a service function and a programmable package name, a target programmable package name corresponding to the target service function, and then obtaining the target programmable package corresponding to the target programmable package name from the stored programmable package.

With reference to the second aspect or the first possible implementation of the second aspect, in a second possible implementation of the second aspect, the MANO stores a correspondence between the programmable package and an acceleration engine partition number, and the method further includes: determining, by the MANO from the correspondence between the programmable package and an acceleration engine partition number, a target partition corresponding to the target programmable package, and sending the target partition to the acceleration engine in the NFVI, where the target partition enables the acceleration engine to run the target programmable package in the target partition.

In this embodiment of the present invention, a programmable package used for service acceleration is not a fixed programmable package pre-installed in the acceleration engine. Instead, the MANO controls a programmable capability of the acceleration engine, and dynamically selects a programmable package based on a service that needs to be accelerated. Therefore, a programmable package of the acceleration engine can be dynamically replaced, and service diversity can be satisfied, thereby improving scalability of a service acceleration function in the NFV system.

According to a third aspect, an embodiment of the present invention provides a service acceleration method in a network functions virtualization NFV system, where the NFV system includes a VNF, a management and orchestration MANO, and a network functions virtualization infrastructure NFVI, and the method includes:

determining, by the VNF, a target service function that needs to be accelerated; obtaining, by the VNF, a target programmable package corresponding to the target service function; and sending, by the VNF, the target programmable package to an acceleration engine in the NFVI by using the MANO, where the target programmable package is used by the acceleration engine to accelerate the target service function that needs to be accelerated.

With reference to the third aspect, in a first possible implementation of the third aspect, the VNF stores a programmable package, and a correspondence between a service function and a programmable package name, and the obtaining, by the VNF, a target programmable package corresponding to the target service function is specifically: determining, by the VNF from the correspondence between a service function and a programmable package name, a target programmable package name corresponding to the target service function, and then obtaining the target programmable package corresponding to the target programmable package name from the stored programmable package.

With reference to any possible implementation of the third aspect, in a second possible implementation of the third aspect, the MANO stores a correspondence between the programmable package and an acceleration engine partition number, and the method further includes: determining, by the MANO from the correspondence between the programmable package and an acceleration engine partition number, a target partition corresponding to the target programmable package, and sending the target partition to the acceleration engine in the NFVI, where the target partition enables the acceleration engine to run the target programmable package in the target partition.

In this embodiment of the present invention, a programmable package used for service acceleration is not a fixed programmable package pre-installed in the acceleration engine. Instead, the VNF and the MANO jointly control a programmable capability of the acceleration engine, dynamically select a programmable package based on a service that needs to be accelerated, and send the programmable package to the acceleration engine in the NFVI. Therefore, a programmable package of the acceleration engine can be dynamically replaced, and service diversity can be satisfied, thereby improving scalability of a service acceleration function in the NFV system.

According to a fourth aspect, an embodiment of the present invention provides a service acceleration method in a network functions virtualization NFV system, where the NFV system includes a VNF, a management and orchestration MANO, and a network functions virtualization infrastructure NFVI, and the method includes:

determining, by the VNF, a target service function that needs to be accelerated; obtaining, by the VNF, a target programmable package corresponding to the target service function; and sending, by the VNF, the target programmable package to an acceleration engine in the NFVI, where the target programmable package is used by the acceleration engine to accelerate the target service function that needs to be accelerated.

With reference to the fourth aspect, in a first possible implementation of the fourth aspect, the VNF stores a programmable package, and a correspondence between a service function and a programmable package name, and the obtaining, by the VNF, a target programmable package corresponding to the target service function is specifically: determining, by the VNF from the correspondence between a service function and a programmable package name, a target programmable package name corresponding to the target service function, and then obtaining the target programmable package corresponding to the target programmable package name from the stored programmable package.

In this embodiment of the present invention, the VNF controls a programmable capability of the acceleration engine, dynamically selects a programmable package based on a service that needs to be accelerated, and sends the programmable package to the acceleration engine in the NFVI. Therefore, a programmable package of the acceleration engine can be dynamically replaced, and service diversity can be satisfied, thereby improving scalability of a service acceleration function in the NFV system.

According to a fifth aspect, an embodiment of the present invention provides a service acceleration system in an NFV system, where function modules in the system implement corresponding functions in the service acceleration method in the first aspect. The system includes a programmable package determining entity and a network functions virtualization infrastructure NFVI, and the NFVI includes an acceleration engine, where the programmable package determining entity is configured to: determine a target service function that needs to be accelerated, obtain a target programmable package corresponding to the target service function, and send the target programmable package to the acceleration engine in the NFVI; and the acceleration engine is configured to run the target programmable package to accelerate the target service function that needs to be accelerated.

According to a sixth aspect, an embodiment of the present invention provides a service acceleration apparatus, which is corresponding to functions implemented by the MANO in the second aspect, where the apparatus includes:

a receiving module, configured to receive a service acceleration request sent by a VNF in an NFV system, where the service acceleration request indicates a target service function that needs to be accelerated; a processing module, configured to obtain a target programmable package corresponding to the target service function; and a sending module, configured to send the target programmable package to an acceleration engine in an NFVI in the NFV system, where the target programmable package is used by the acceleration engine to accelerate the target service function that needs to be accelerated.

According to a seventh aspect, an embodiment of the present invention provides a server, where the server is located in a network functions virtualization NFV system; the server includes an I/O interface, a processor, and a memory that are connected to each other; the memory is configured to store program code; and the processor invokes the program code in the memory to perform all or some steps performed by the MANO in the second aspect.

According to an eighth aspect, an embodiment of the present invention provides a service acceleration apparatus, and the apparatus includes:

a processing module, configured to: determine a target service function that needs to be accelerated, and obtain a target programmable package corresponding to the target service function; and a sending module, configured to send the target programmable package to an acceleration engine in an NFVI by using a MANO, where the target programmable package is used by the acceleration engine to accelerate the target service function that needs to be accelerated.

According to a ninth aspect, an embodiment of the present invention provides a server, where the server is located in a network functions virtualization NFV system; the server includes an I/O interface, a processor, and a memory that are connected to each other; the memory is configured to store program code; and the processor invokes the program code in the memory to perform all or some steps performed by the VNF in the third aspect.

According to a tenth aspect, an embodiment of the present invention provides a service acceleration apparatus, and the apparatus includes:

a processing module, configured to: determine a target service function that needs to be accelerated, and obtain a target programmable package corresponding to the target service function; and a sending module, configured to send the target programmable package to an acceleration engine in an NFVI, where the target programmable package is used by the acceleration engine to accelerate the target service function that needs to be accelerated.

According to an eleventh aspect, an embodiment of the present invention provides a server, where the server is located in a network functions virtualization NFV system; the server includes an I/O interface, a processor, and a memory that are connected to each other; the memory is configured to store program code; and the processor invokes the program code in the memory to perform all or some steps performed by the VNF in the fourth aspect.

It can be learned from the foregoing technical solutions that the embodiments of the present invention have the following advantages:

The programmable package determining entity in the NFV system determines the target service function that needs to be accelerated, then obtains the target programmable package corresponding to the target service function, and sends the target programmable package to the acceleration engine in the network functions virtualization infrastructure (NFVI). The acceleration engine runs the target programmable package to accelerate the target service function that needs to be accelerated. In the embodiments of the present invention, a programmable package used for service acceleration is not a fixed programmable package pre-installed in the acceleration engine, but is a programmable package dynamically determined based on a service function that needs to be accelerated currently. Therefore, a programmable package of the acceleration engine can be dynamically replaced, thereby improving scalability of a service acceleration function in the NFV system.

DESCRIPTION OF EMBODIMENTS

To make technical solutions and beneficial effects of the present invention clearer, the following further describes the present invention in detail with reference to the accompanying drawings and the embodiments. It should be understood that the specific embodiments described herein are merely used to explain the present invention but are not intended to limit the present invention.

NFV (network functions virtualization) is proposed by a telecommunications network operator. In the NFV, an IT virtualization technology is used, an industry-standard large-capacity server, a memory, and a switch are used as universal hardware platforms, and virtualization and cloud software is deployed on these commodity hardware platforms to carry various network software functions. Various network elements operate as virtual network functions (VNF). In the NFV system, software is flexibly loaded, flexible deployment and configuration are implemented at various locations, such as a data center, a network node, and a client, so as to speed up network deployment and adjustment, reduce service deployment complexity, and improve unification, generalization, adaptation, and the like of a network device.

Figure 1:
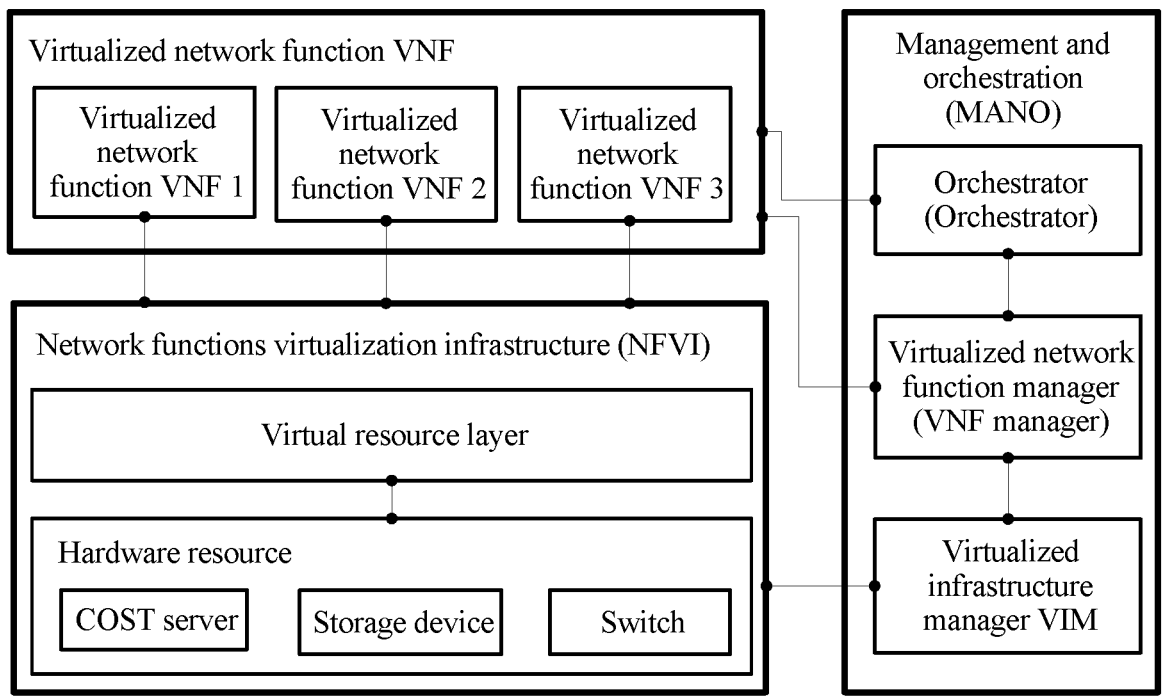
FIG. 1 is a diagram of a network functions virtualization architecture according to an embodiment of the present invention.

FIG. 1 is a diagram of a network functions virtualization architecture. The architecture includes three modules: a VNF, a MANO, and an NFVI.

1. NFV Infrastructure (NFVI)

The NFVI provides a hardware resource, a virtual resource, management thereof, and a virtualized operating environment for the VNF. The NFVI is an NFV infrastructure layer including hardware and software, and includes a hardware resource including a COTS server, a switch, and a storage device, and a virtual resource layer including a virtual software layer. A scheduling engine of a virtual machine at the virtual resource layer is referred to as "Hypervisor", and a specific implementation includes an open-source KVM and XEN, and a closed-source EXSi and Hyper-V and the like. In addition, the virtual resource layer further provides a virtual switch (vSwitch) to support a capability for networking and interworking between virtual machines (VM) and between a virtual machine and an external network.

The NFVI finally allocates a resource container, namely, a virtual machine, to an upper-layer virtualized network function by using the virtual resource layer, and the VNF uses the virtual machine like a physical server. Generally, a plurality of virtual machines need to be applied for to collaboratively work for one virtualized network function.

2. NFV Management and Orchestration (MANO)

MANO is a core link connecting the NFVI and the VNF, including an orchestrator, a virtualized network function manager (VNF manager), and a virtualized infrastructure manager (VIM). The VIM is responsible for managing all virtual resources of a data center, and a commonly used VIM includes an open-source OpenStack and a closed-source Vmware. The virtualized network function manager is responsible for life cycle management of the VNF, including initialization, NFVI resource configuration of the VNF, capacity expansion, capacity reduction, disassembly, query, status monitoring, and the like. One VNF manager usually manages one or more VNFs, and one MANO system usually includes a plurality of VNF managers. The orchestrator implements life cycle management of a network service combined by a plurality of VNFs and unified scheduling of resources provided by the VIM.

3. Virtualized Network Function (VNF), Also Referred to as a Virtualized Logical Network Element.

The VNF is various virtualized network functions. The network functions conventionally run on various dedicated hardware, and after virtualization, run on a virtual machine provided by the VNFI. Functions of the following conventional devices may be virtualized.

The conventional device includes a processing device, for example, a broadband network gateway (BNG), a gateway GPRS support node (GGSN)/packet data network gateway (PDN-GW), a firewall (FW)/NAT, an IP security protocol gateway (IPSEC GW), a DPI, an SBC, and a network monitoring device. Such device performs complex processing such as packet analysis, forwarding, QoS charging, a policy enforcement, and security control for a user or a session.

The conventional device includes a control device, for example, an IMS, a mobility management entity (MME), a serving GPRS support node (SGSN), a policy and charging rules function (PCRF), an LR/home subscriber server (HSS), an AAA, and a CG Such device implements network operation control, user access control, and user service control.

The conventional device includes other devices, for example, a processing device below a network layer such as a base station and a router.

The VNF is a key component of an operator network. In a process of migrating to NFV, not only an original carrier-grade capability and an original network function are preserved, but also an advantage of a distributed system in cloud computing is utilized to implement key cloud features such as auto scaling and N-way redundancy.

In addition, the network functions virtualization architecture may further include a function module, such as an EMS and an OSS/BSS, and details are not described herein.

It should be noted that the VNF, the MANO, and the NFVI may be deployed differently based on different networks. The VNF, the MANO, and the NFVI may be located on a same physical device. For example, the MANO and VNF are carried on different virtual machines of a same physical device. Alternatively, the VNF, the MANO, and the NFVI may be located on a plurality of physical devices. For example, the MANO is deployed on a plurality of physical devices in a distributed manner or deployed on one physical device, and a virtual machine of one VNF is deployed on a plurality of physical devices in a distributed manner or deployed on one physical device. A specific networking and deployment form is not limited in the present invention.

Figure 2:
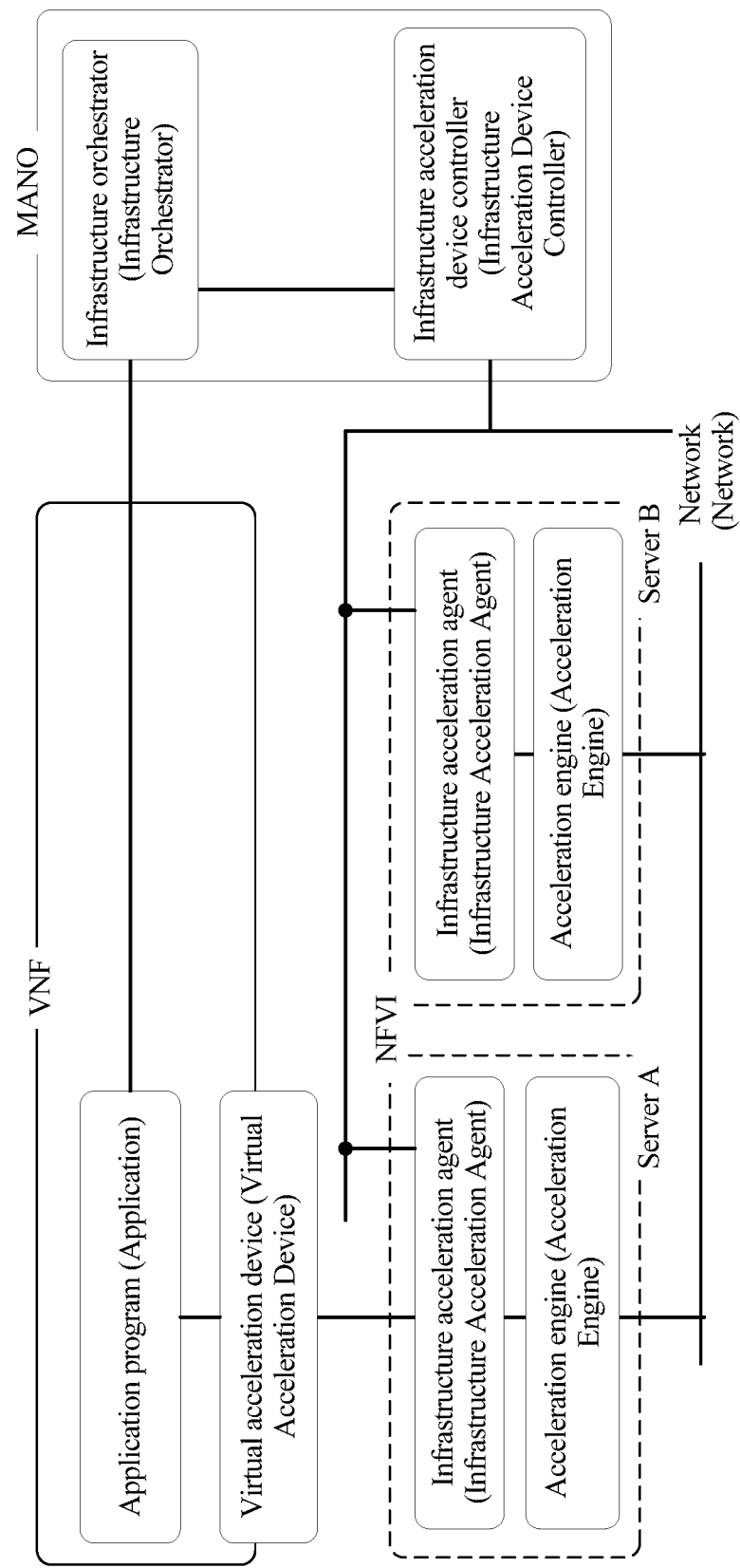
FIG. 2 is a structural diagram of distributed deployment of NFV acceleration resources according to an embodiment of the present invention.
Figure 3:
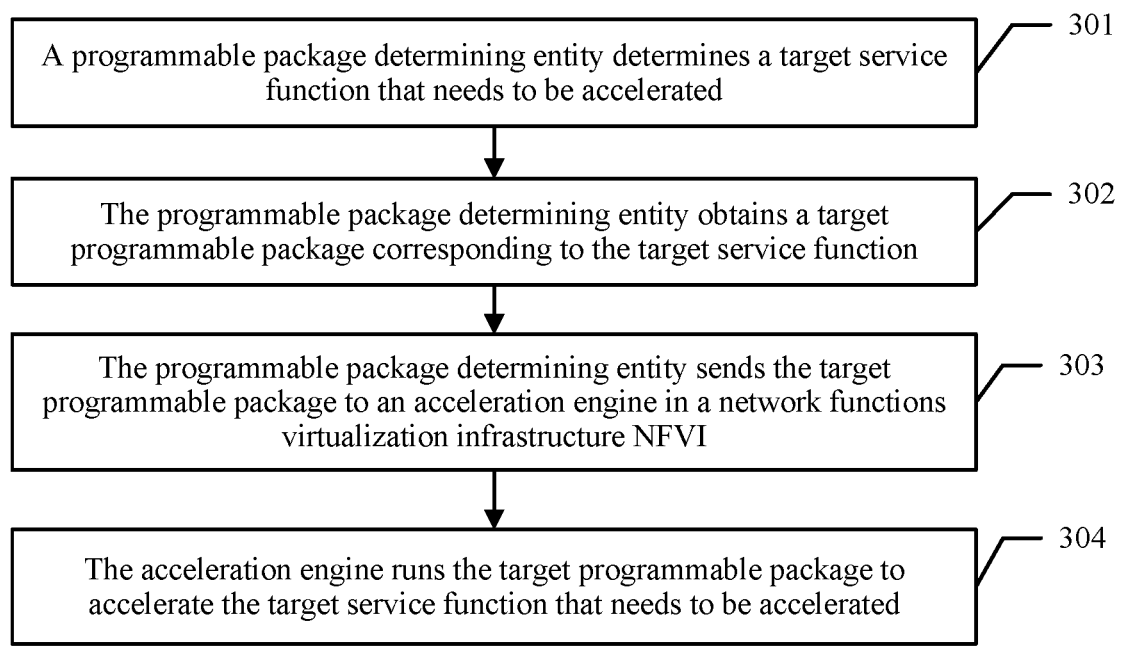
FIG. 3 is a flowchart of a service acceleration method in an NFV system according to an embodiment of the present invention.

For the COTS server in the NFV infrastructure, because a CPU has a relatively poor processing capability and relatively low performance in network data processing and a complex algorithm operation, an acceleration device needs to be used to perform service acceleration processing. The acceleration device may be deployed in a distributed manner. A structural diagram of distributed deployment of acceleration resources is shown in FIG. 2. FIG. 2 shows acceleration-related function entities in the NFV system.

The function entities communicate with each other by using a network. The function entities are defined as follows:

The VNF includes an application program and a virtual acceleration device. The application program is used for service processing, and the virtual acceleration device provides the application program with communication and configuration interfaces that use the acceleration device. The application program completes a service acceleration function by communicating and interacting with the virtual acceleration device and an acceleration engine.

The MANO includes an infrastructure orchestrator and an infrastructure acceleration device controller. The infrastructure orchestrator is responsible for life cycle management of the NFVI, and under main control by the infrastructure orchestrator, the infrastructure acceleration device controller is responsible for centralized management of acceleration devices.

The NFVI (NFV infrastructure) includes an infrastructure acceleration agent and an acceleration engine. The infrastructure acceleration agent is deployed on each decentralized server (a server A and a server B shown in the figure) in a distributed manner, and is overall controlled by the infrastructure acceleration device controller. The acceleration engine is used to implement the service acceleration function.

The following describes in detail a service acceleration method in an NFV system in an embodiment of the present invention.

301. A programmable package determining entity determines a target service function that needs to be accelerated.

The programmable package determining entity in this embodiment of the present invention is the VNF or the VNF and the MANO in the structural diagram of the distributed deployment of the acceleration resources shown in FIG. 2, and is configured to determine, based on a specific service function that needs to be accelerated, a corresponding programmable package used for acceleration.

When a CPU resource corresponding to a service function has a poor processing capability, performance is relatively low. An acceleration device needs to be used to perform service acceleration processing, and the programmable package determining entity determines the target service function that needs to be accelerated.

A service function is various virtualized network functions, for example, a BNQ a GGSN/PDN-GW, an FW/NAT, an IPSEC GW, a DPI, an SBC, a network monitoring device function, an IMS, an MME, an SGSN, a PCRF, an LR/HSS, an AAA, and a CG.

302. The programmable package determining entity obtains a target programmable package corresponding to the target service function.

Each service function has a corresponding programmable package used for acceleration, and the programmable package is used to run in an acceleration engine to accelerate the service function. For example, a correspondence may be as follows: A programmable package corresponding to a network/DPI service function is a programmable package 1, a programmable package corresponding to a network/IPSEC service function is a programmable package 2, and a programmable package corresponding to a network/ACL service function is a programmable package 3.

After determining the target service function that needs to be accelerated, the programmable package determining entity determines the target programmable package corresponding to the target service function, and obtains the target programmable package.

303. The programmable package determining entity sends the target programmable package to an acceleration engine in a network functions virtualization infrastructure NFVI.

After obtaining the target programmable package, the programmable package determining entity sends the target programmable package to the acceleration engine in the NFVI.

304. The acceleration engine runs the target programmable package to accelerate the target service function that needs to be accelerated.

The acceleration engine loads the target programmable package, and runs the programmable package to complete a service acceleration service.

In this embodiment of the present invention, a programmable package used for service acceleration is not a fixed programmable package pre-installed in the acceleration engine, but is a programmable package dynamically determined based on a service function that needs to be accelerated currently. Therefore, a programmable package of the acceleration engine can be dynamically replaced, and service diversity is satisfied, thereby improving scalability of a service acceleration function in the NFV system.

In one implementation, the programmable package determining entity is the VNF and the MANO, and the MANO controls a programmable capability of the acceleration engine. In another implementation, the programmable package determining entity is the VNF and the MANO, and the VNF and the MANO collaboratively control a programmable capability of the acceleration engine. In a feasible implementation, the programmable package determining entity is the VNF, and the VNF controls a programmable capability of the acceleration engine.

The following describes the three feasible implementations separately.

I. The programmable package determining entity is the VNF and the MANO, and the MANO controls the programmable capability of the acceleration engine.

Figure 4:
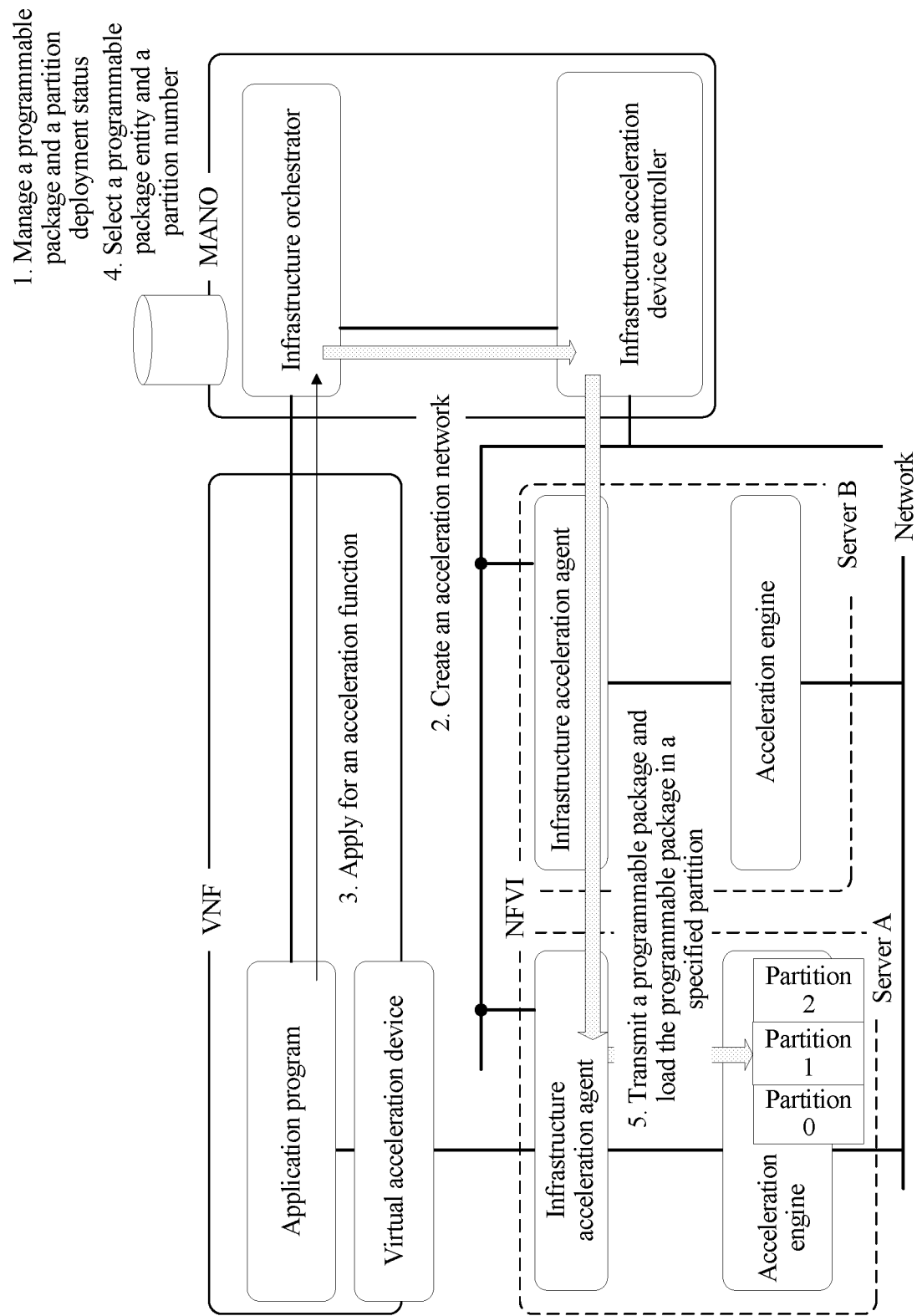
FIG. 4 is a schematic diagram of a service acceleration process when a MANO controls a programmable capability of an acceleration engine according to an embodiment of the present invention.

A schematic diagram of a service acceleration process corresponding to this implementation is shown in FIG. 4.

1. The MANO manages a programmable package and a partition status.

The MANO manages the programmable package of the acceleration engine. Specifically, an infrastructure orchestrator in the MANO manages the programmable package of the acceleration engine.

The infrastructure orchestrator stores the programmable package, and records a correspondence between a service function that needs to be accelerated and a programmable package name. An example of the correspondence between a service function that needs to be accelerated and a programmable package name is shown in Table 1.

TABLE 1

| Sequence number | Service function | Programmable package name |
| --- | --- | --- |
| 1 | Network/DPI | Programmable package 1 |
| 2 | Network/IPSEC | Programmable package 2 |
| 3 | Network/ACL | Programmable package 3 |
| 4 | Computing/DH (Diffie-Hellman) public-key algorithm | Programmable package 4 |
| 5 | Storage/compression | Programmable package 5 |
| ... | ... | ... |

The correspondence that is between a service function and a programmable package name and is stored in the MANO may be updated based on service development and specific deployment of the NFV system, for example, may be manually configured by an NFV system operator.

Further, each acceleration engine in the NFVI may have a plurality of programmable package partitions. The partitions are isolated from each other, and may dynamically load different programmable packages respectively, so that there is no coupling relationship between various service acceleration capabilities, and a service acceleration capability is deployed and upgraded independently.

Optionally, the MANO stores a partition deployment status on each acceleration engine, to be specific, stores a correspondence between the programmable package and an acceleration engine partition.

The infrastructure orchestrator in the MANO collects and records a partition deployment status on an acceleration engine of each server. An example of the correspondence is shown in Table 2. For example, a server A has three partitions: a partition 0, a partition 1, and a partition 2. A programmable package 1 is to be deployed in the partition 0, no programmable package is allocated to the partition 1 temporarily, and a programmable package 2 is to be deployed in the partition 2. A server B is divided into two partitions: a partition 3 and a partition 4. A programmable package 3 is to be deployed in the partition 3, and the programmable package 1 is to be deployed in the partition 4.

TABLE 2

| Server number | Partition number | Programmable package name |
| --- | --- | --- |
| A | 0 | Programmable package 1 |
| A | 1 | Empty |
| A | 2 | Programmable package 2 |
| B | 3 | Programmable package 3 |
| B | 4 | Programmable package 1 |
| ... | ... | ... |

Similarly, the partition deployment status that is on the acceleration engine of each server and is stored in the MANO may be updated based on service development and specific deployment of the NFV system, for example, may be manually configured by an NFV system operator.

2. An acceleration network is created and communication channels are established between an application program, the infrastructure orchestrator, an infrastructure acceleration device controller, an infrastructure acceleration agent, and the acceleration engine, so as to facilitate communication between all entities.

3. An application program in the VNF determines the target service function that needs to be accelerated, and sends a service acceleration request to the infrastructure orchestrator in the MANO. The request carries the target service function that needs to be accelerated, and indicates the service function that needs to be accelerated.

4. The infrastructure orchestrator in the MANO determines, based on the target service function that needs to be accelerated and from the stored correspondence between a service function and a programmable package name shown in Table 1, a target programmable package name corresponding to the target service function, then obtains the target programmable package corresponding to the target programmable package name from the stored programmable package, and then determines a target partition corresponding to the target programmable package based on the partition deployment status on the acceleration engine (to be specific, the correspondence between the programmable package and an acceleration engine partition number shown in Table 2). The target partition is a target partition number of the acceleration engine.

5. The infrastructure orchestrator in the MANO transmits the target programmable package to the acceleration engine in the NFVI by using the acceleration network, adds the target partition number to the target programmable package, and loads the target programmable package in the target partition of the acceleration engine.

6. The acceleration engine runs the target programmable package in the specified target partition to complete the service acceleration service of the target service function.

In this embodiment of the present invention, the MANO controls the programmable capability of the acceleration engine. A programmable package may be dynamically selected based on a service that needs to be accelerated, so as to satisfy service diversity and improve scalability of the service acceleration function in the NFV system. In addition, a corresponding acceleration engine partition may be dynamically selected based on a programmable package, and the acceleration engine dynamically loads different programmable packages in different partitions, so that there is no coupling relationship between various service acceleration capabilities, and a service acceleration capability can be deployed and upgraded independently.

II. The programmable package determining entity is the VNF and the MANO, and the VNF and the MANO collaboratively control the programmable capability of the acceleration engine.

Figure 5:
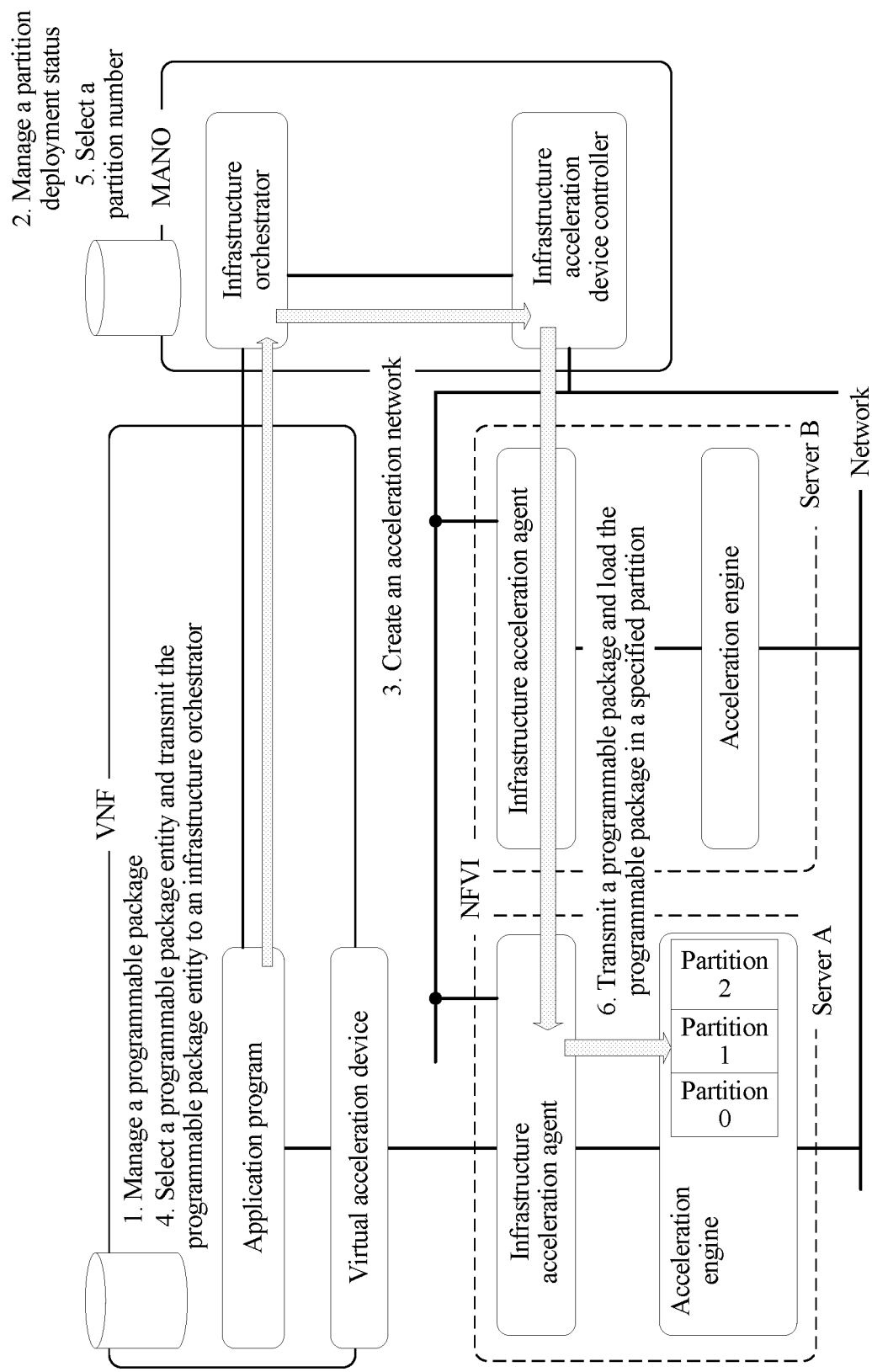
FIG. 5 is a schematic diagram of a service acceleration process when a VNF and a MANO collaboratively control a programmable capability of an acceleration engine according to an embodiment of the present invention.

A schematic diagram of a service acceleration process corresponding to this implementation is shown in FIG. 5.

1. The VNF manages a programmable package.

The VNF manages the programmable package of the acceleration engine. Specifically, an application program in the VNF manages the programmable package of the acceleration engine.

The application program stores the programmable package, and records a correspondence between a service function that needs to be accelerated and a programmable package name. An example of the correspondence between a service function that needs to be accelerated and a programmable package name is shown in Table 1.

The correspondence that is between a service function and a programmable package name and is stored in the VNF may be updated based on service development and specific deployment of the NFV system, for example, may be manually configured by an NFV system operator.

2. The MANO manages a programmable package partition deployment status on each acceleration engine.

Same as the embodiment shown in FIG. 4, an infrastructure orchestrator in the MANO collects and records a partition deployment status on an acceleration engine of each server, namely, the correspondence between the programmable package and an acceleration engine partition number shown in Table 2.

Each acceleration engine in the NFVI may have a plurality of programmable package partitions. The partitions are isolated from each other, and may dynamically load different programmable packages respectively, so that there is no coupling relationship between various service acceleration capabilities, and a service acceleration capability is deployed and upgraded independently.

3. An acceleration network is created and communication channels are established between the application program, the infrastructure orchestrator, an infrastructure acceleration device controller, an infrastructure acceleration agent, and the acceleration engine, so as to facilitate communication between all entities.

4. The application program in the VNF determines the target service function that needs to be accelerated, determines, from a stored correspondence between a service function and a programmable package name, a target programmable package name corresponding to the target service function, then obtains a target programmable package corresponding to the target programmable package name from the stored programmable package, and sends the target programmable package to the infrastructure orchestrator in the MANO.

5. The infrastructure orchestrator in the MANO selects an appropriate acceleration engine partition number based on the partition deployment status on the acceleration engine. Specifically, a target partition corresponding to the target programmable package is determined from the correspondence between the programmable package and an acceleration engine partition number.

6. The infrastructure orchestrator in the MANO transmits the target programmable package to the acceleration engine by using the acceleration network, adds a target partition number of the acceleration engine to the target programmable package, and loads the target programmable package in the target partition of the acceleration engine.

7. The acceleration engine in the NFVI runs the target programmable package in the specified target partition to complete the service acceleration service of the target service function.

In this embodiment of the present invention, the VNF and the MANO collaboratively control the programmable capability of the acceleration engine. A programmable package may be dynamically selected based on a service that needs to be accelerated, so as to satisfy service diversity and improve scalability of the service acceleration function in the NFV system. In addition, a corresponding acceleration engine partition may be dynamically selected based on a programmable package, and the acceleration engine dynamically loads different programmable packages in different partitions, so that there is no coupling relationship between various service acceleration capabilities, and a service acceleration capability can be deployed and upgraded independently.

III. The programmable package determining entity is the VNF, and the VNF controls the programmable capability of the acceleration engine.

Figure 6:
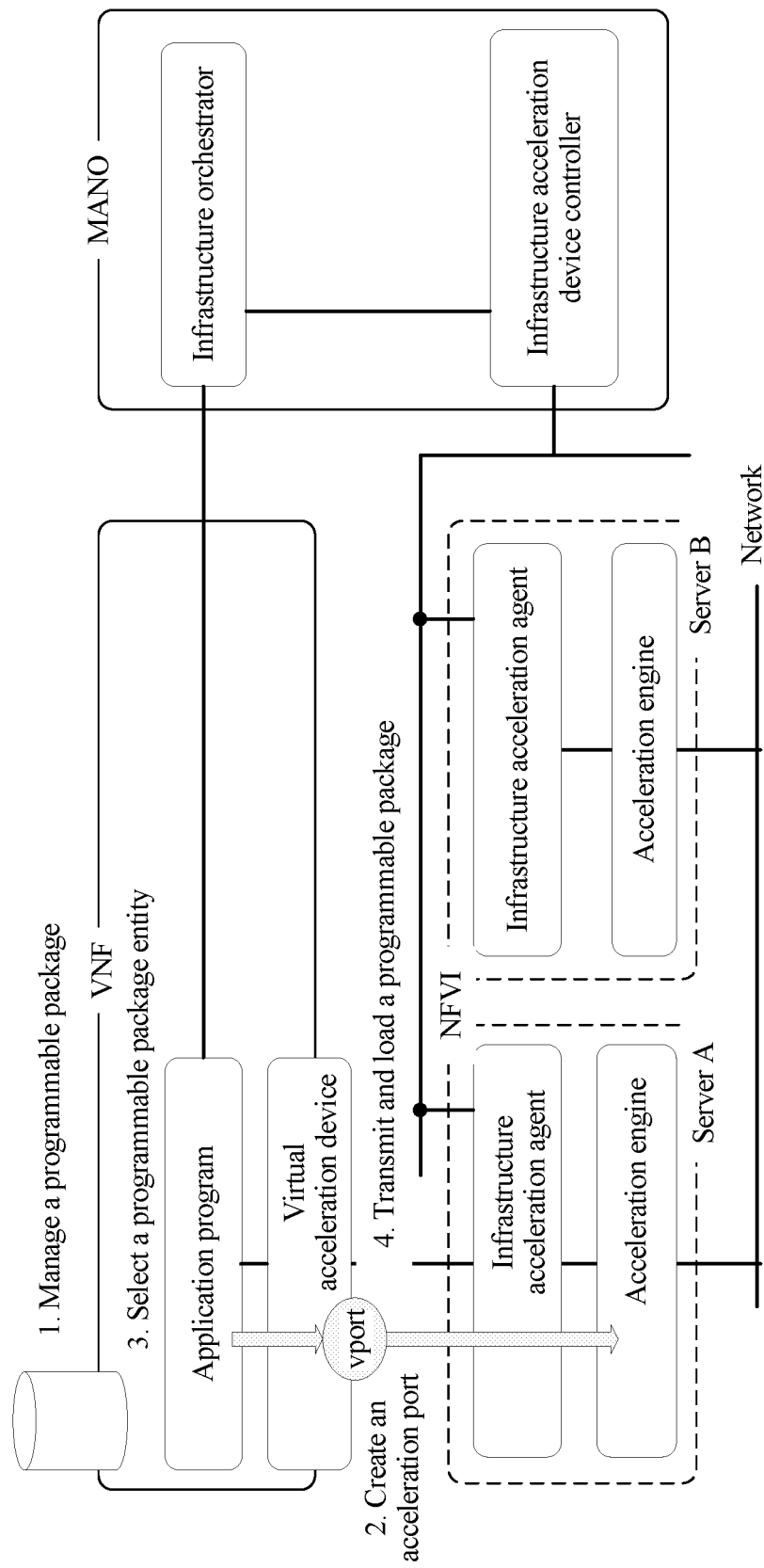
FIG. 6 is a schematic diagram of a service acceleration process when a VNF controls a programmable capability of an acceleration engine according to an embodiment of the present invention.

A schematic diagram of a service acceleration process corresponding to this implementation is shown in FIG. 6.

1. The VNF manages a programmable package.

The VNF manages the programmable package of the acceleration engine. Specifically, an application program in the VNF manages the programmable package of the acceleration engine.

The application program stores the programmable package, and records a correspondence between a service function that needs to be accelerated and a programmable package name. An example of the correspondence between a service function that needs to be accelerated and a programmable package name is shown in Table 1.

The correspondence that is between a service function and a programmable package name and is stored in the VNF may be updated based on service development and specific deployment of the NFV system, for example, may be manually configured by an NFV system operator.

2. An acceleration port (vport) for communication between the application program in the VNF and the acceleration engine in the NFV is created, and an interface is provided for an application program to use a virtual acceleration device.

3. The application program selects a corresponding programmable package based on a service function that needs to be accelerated.

The application program in the VNF determines the target service function that needs to be accelerated, determines, from the stored correspondence between a service function and a programmable package name, a target programmable package name corresponding to the target service function, and then obtains a target programmable package corresponding to the target programmable package name from the stored programmable package.

4. The application program in the VNF transmits the programmable package to the acceleration engine by using the acceleration port (vport), and loads the programmable package.

5. The acceleration engine in the NFV runs the programmable package to complete the acceleration service of the target service function.

It should be noted that because the application program in the VNF can only perceive the virtual acceleration device and cannot manage actual programmable package partitions in the acceleration engine of the NFV, the solution cannot support a multi-programmable package partition.

In this embodiment of the present invention, the VNF controls the programmable capability of the acceleration engine, and may dynamically select a programmable package based on a service that needs to be accelerated, thereby satisfying service diversity and improving scalability of the service acceleration function in the NFV system.

The foregoing describes the service acceleration method in the embodiments of the present invention, and the following describes a service acceleration system and a service acceleration apparatus in embodiments of the present invention from a perspective of a function module.

Figure 7:
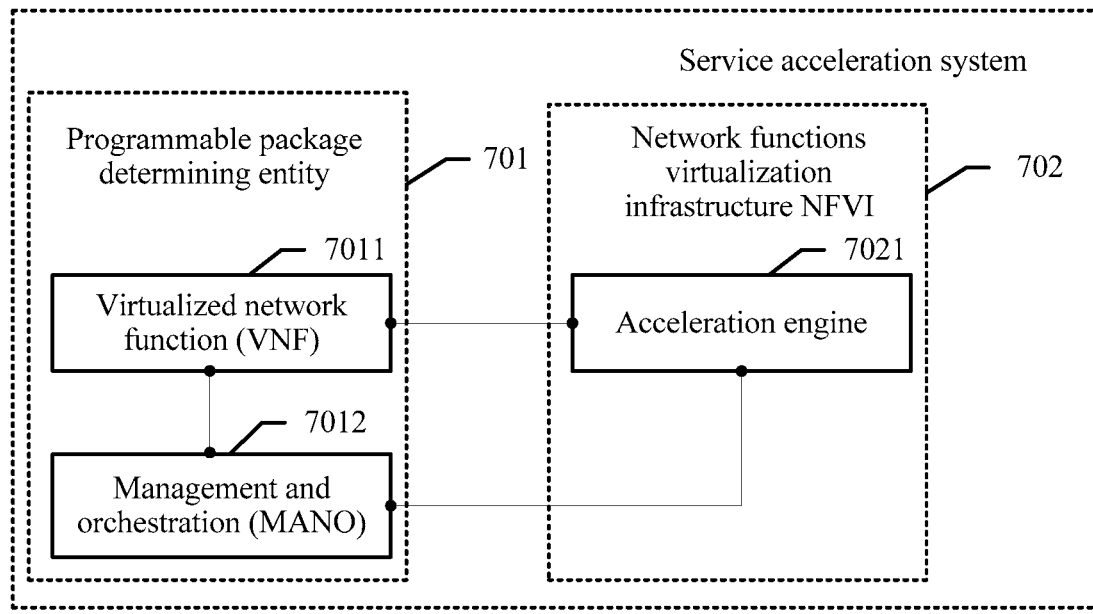
FIG. 7 is a schematic diagram of a service acceleration system according to an embodiment of the present invention.

As shown in FIG. 7, a service acceleration system in an embodiment of the present invention includes:

a programmable package determining entity 701 and a network functions virtualization infrastructure NFVI 702. The NFVI 702 includes an acceleration engine 7021.

The programmable package determining entity 701 is configured to: determine a target service function that needs to be accelerated, obtain a target programmable package corresponding to the target service function, and send the target programmable package to the acceleration engine in the NFVI. The acceleration engine 7021 is configured to run the target programmable package to accelerate the target service function that needs to be accelerated.

In a possible implementation, the programmable package determining entity 701 includes a VNF 7011 and a management and orchestration MANO 7012.

The MANO 7012 stores a programmable package, and a correspondence between a service function and a programmable package name. The VNF 7011 is configured to: determine the target service function that needs to be accelerated, and send a service acceleration request to the MANO 7012, where the service acceleration request indicates the target service function that needs to be accelerated. The MANO 7012 is configured to: determine, from the correspondence between a service function and a programmable package name, a target programmable package name corresponding to the target service function, then obtain the target programmable package corresponding to the target programmable package name from the stored programmable package, and then send the target programmable package to the acceleration engine 7021 in the NFVI.

Optionally, the MANO 7012 stores a correspondence between the programmable package and an acceleration engine partition number. The MANO 7012 is further configured to: determine, from the correspondence between the programmable package and an acceleration engine partition number, a target partition corresponding to the target programmable package, and send the target partition to the acceleration engine 7021 in the NFVI. The acceleration engine 7021 is specifically configured to run the target programmable package in the target partition.

In one implementation, the programmable package determining entity includes a VNF 7011 and a MANO 7012.

The VNF 7011 stores a programmable package, and a correspondence between a service function and a programmable package name. The VNF 7011 is configured to: determine the target service function that needs to be accelerated, determine, from the correspondence between a service function and a programmable package name, a target programmable package name corresponding to the target service function, then obtain the target programmable package corresponding to the target programmable package name from the stored programmable package, and send the target programmable package to the MANO 7012. The MANO 7012 is configured to send the target programmable package to the acceleration engine 7021 in the NFVI.

Optionally, the MANO 7012 stores a correspondence between the programmable package and an acceleration engine partition number. The MANO 7012 is further configured to: determine, from the correspondence between the programmable package and an acceleration engine partition number, a target partition corresponding to the target programmable package, and send the target partition to the acceleration engine 7021 in the NFVI. The acceleration engine 7021 is specifically configured to run the target programmable package in the target partition.

In a possible implementation, the programmable package determining entity includes a VNF 7011. The VNF 7011 stores a programmable package, and a correspondence between a service function and a programmable package name. The VNF 7011 is configured to: determine the target service function that needs to be accelerated, determine, from the correspondence between a service function and a programmable package name, a target programmable package name corresponding to the target service function, then obtain the target programmable package corresponding to the target programmable package name from the stored programmable package, and send the target programmable package to the acceleration engine 7021 in the NFVI.

An embodiment of the present invention further provides a service acceleration apparatus, and the service acceleration apparatus specifically implements functions performed by the MANO in the embodiment shown in FIG. 4. The functions may be implemented by hardware, or may be implemented by hardware by executing a corresponding software program. The hardware and the software include one or more unit modules corresponding to the functions, and the unit module may be software and/or hardware.

Figure 8:
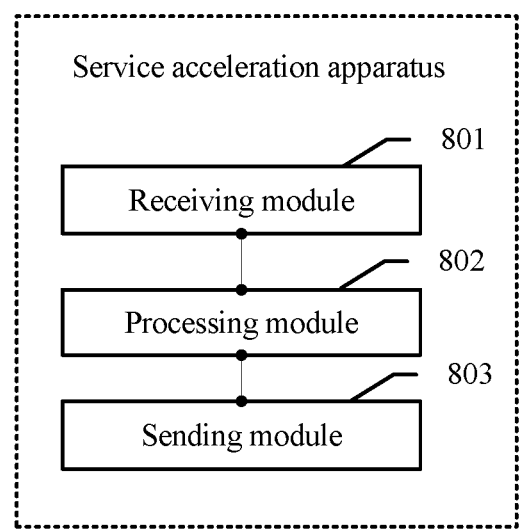
FIG. 8 is a schematic diagram of function modules of a service acceleration apparatus according to an embodiment of the present invention.

As shown in FIG. 8, the service acceleration apparatus includes:

a receiving module 801, configured to receive a service acceleration request sent by a VNF in an NFV system, where the service acceleration request indicates a target service function that needs to be accelerated;

a processing module 802, configured to obtain a target programmable package corresponding to the target service function; and a sending module 803, configured to send the target programmable package to an acceleration engine in an NFVI in the NFV system, where the target programmable package is used by the acceleration engine to accelerate the target service function that needs to be accelerated.

In some implementations, the service acceleration apparatus stores a programmable package, and a correspondence between a service function and a programmable package name. The processing module 802 is specifically configured to: determine, from the correspondence between a service function and a programmable package name, a target programmable package name corresponding to the target service function, and then obtain the target programmable package corresponding to the target programmable package name from the stored programmable package.

In some implementations, the service acceleration apparatus stores a correspondence between the programmable package and an acceleration engine partition number. The processing module 802 is further configured to determine, from the correspondence between the programmable package and an acceleration engine partition number, a target partition corresponding to the target programmable package. The sending module 803 is further configured to send the target partition to the acceleration engine in the NFVI. The target partition enables the acceleration engine to run the target programmable package in the target partition.

An embodiment of the present invention further provides a service acceleration apparatus, and the service acceleration apparatus implements functions performed by the VNF in the embodiment shown in FIG. 5 or FIG. 6. The functions may be implemented by hardware, or may be implemented by hardware by executing a corresponding software program. The hardware and the software include one or more unit modules corresponding to the functions, and the unit module may be software and/or hardware.

Figure 9:
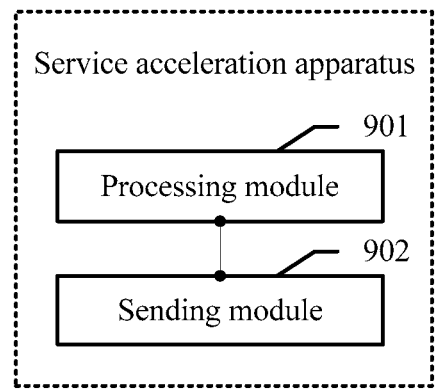
FIG. 9 is a schematic diagram of function modules of a service acceleration apparatus according to an embodiment of the present invention.

As shown in FIG. 9, the service acceleration apparatus includes:

a processing module 901, configured to: determine a target service function that needs to be accelerated, and obtain a target programmable package corresponding to the target service function; and a sending module 902, configured to: send the target programmable package to a MANO in an NFV system, and send the target programmable package to an acceleration engine in an NFVI by using the MANO, where the target programmable package is used by the acceleration engine to accelerate the target service function that needs to be accelerated.

In some specific implementations, the service acceleration apparatus stores a programmable package, and a correspondence between a service function and a programmable package name. The processing module 901 is specifically configured to: determine, from the correspondence between a service function and a programmable package name, a target programmable package name corresponding to the target service function, and then obtain the target programmable package corresponding to the target programmable package name from the stored programmable package.

The service acceleration apparatus in this implementation specifically implements functions performed by the VNF in the embodiment shown in FIG. 5.

Optionally, in another optional implementation, the processing module 901 is configured to: determine a target service function that needs to be accelerated, and obtain a target programmable package corresponding to the target service function; and the sending module 902 is configured to directly send the target programmable package to an acceleration engine in an NFVI, where the target programmable package is used by the acceleration engine to accelerate the target service function that needs to be accelerated.

The service acceleration apparatus in this implementation specifically implements functions performed by the VNF in the embodiment shown in FIG. 6.

From a perspective of a hardware structure, the service acceleration apparatus shown in FIG. 8 or FIG. 9 in the embodiments of the present invention, or the VNF or the MANO in the NFV system (FIG. 1 to FIG. 8) may exist in a form of a server, a server cluster, or one server. The following describes the hardware structure of the server.

Figure 10:
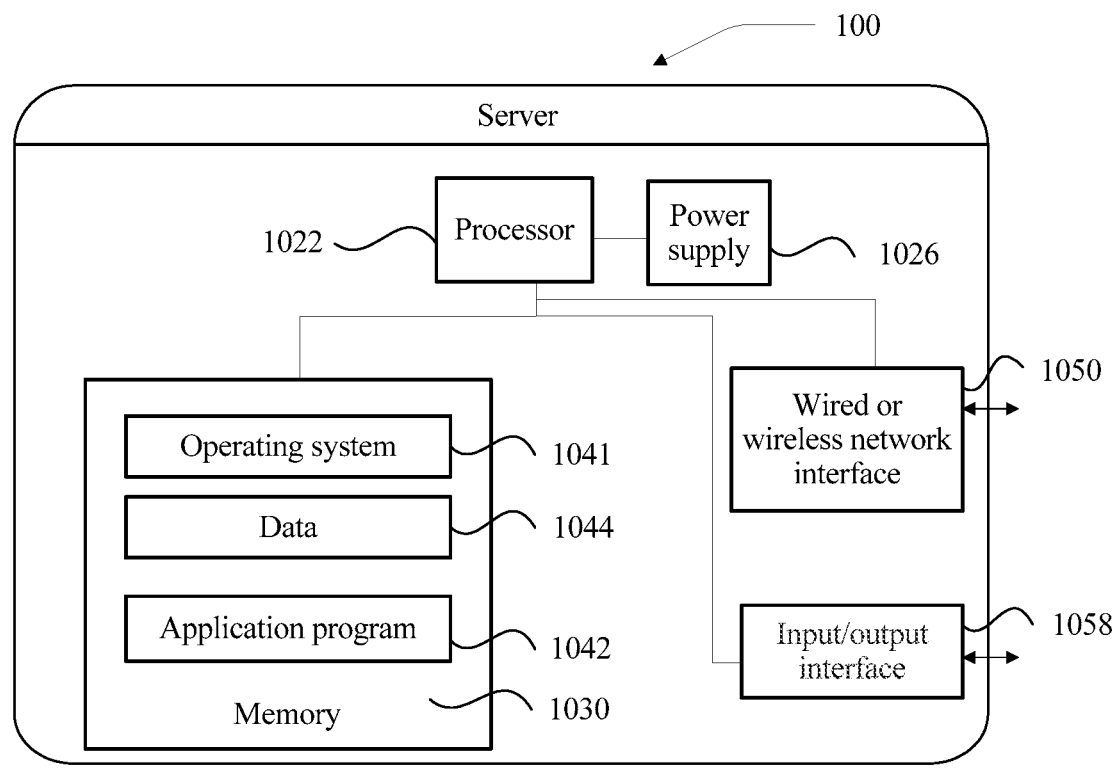
FIG. 10 is a schematic structural diagram of hardware of a server according to an embodiment of the present invention.

FIG. 10 is a schematic structural diagram of a server according to an embodiment of the present invention. The server 100 may differ greatly because of different configurations or different performance, and may include at least one central processing unit (CPU) 1022 (for example, at least one processor), and a memory 1030. The memory 1030 stores at least one application program 1042, data 1044, and at least one operating system 1041. The program stored in the memory 1030 may include at least one module (not shown in the figure), and each module may include a series of instruction operations for the server. Further, the central processing unit 1022 may be configured to communicate with the memory 1030.

In an embodiment, the processor 1022 performs a series of instruction operations in the memory 1030 to perform functions of the service acceleration apparatus shown in FIG. 8 (namely, functions performed by the MANO in the embodiment of the present invention shown in FIG. 4).

In an embodiment, the processor 1022 performs a series of instruction operations in the memory 1030 to perform functions performed by the VNF in the embodiment of the present invention shown in FIG. 5.

In an embodiment, the processor 1022 performs a series of instruction operations in the memory 1030 to perform functions performed by the VNF in the embodiment of the present invention shown in FIG. 6.

In addition, the operating system 1041 may be, for example, Windows Server™, Mac OS X™, Unix™, Linux™, and FreeBSD™.

The server 100 may further include at least one power supply 1026, at least one wired or wireless network interface 1050, and at least one input/output interface 1058.

In addition, the present invention further provides a computer storage medium, and the medium stores an application program. When the program is executed, some or all of the steps in the foregoing service acceleration method (the embodiments shown in FIG. 3 to FIG. 6) are performed.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or at least two units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A service acceleration method in a network functions virtualization (NFV) system, wherein the method comprises:
    determining, by a programmable package determining entity, a target service function that needs to be accelerated;
    obtaining, by the programmable package determining entity, a target programmable package corresponding to the target service function;
    sending, by the programmable package determining entity, the target programmable package to an acceleration engine in a network functions virtualization infrastructure (NFVI); and
    running, by the acceleration engine, the target programmable package to accelerate the target service function that needs to be accelerated,
    wherein each service function has a corresponding programmable package used for acceleration
    the programmable package determining entity comprises a virtualized network function (VNF) and a management and orchestration (MANO), wherein
    the MANO is configured to store a programmable package, and a correspondence between a service function and a programmable package name; and, wherein
    determining, by the programmable package determining entity, the target service function that needs to be accelerated comprises:
    determining, by the VNF, the target service function that needs to be accelerated;
    obtaining, by the programmable package determining entity, the target programmable package corresponding to the target service function comprises:
    sending, by the VNF, a service acceleration request to the MANO, wherein the service acceleration request indicates the target service function that needs to be accelerated;
    determining, by the MANO from the correspondence between a service function and a programmable package name, and a target programmable package name corresponding to the target service function; and
    obtaining the target programmable package corresponding to the target programmable package name from the stored programmable package; and
    sending, by the programmable package determining entity, the target programmable package to an acceleration engine in an NFVI comprises:
    sending, by the MANO, the target programmable package to the acceleration engine in the NFVI
    wherein the service function includes a network/DPI (Deep Packet Inspection) service function, a network/IPSEC (IP Security) service function, a network/ACL (Access Control List) service function, a computing/DH (Diffie-Hellman) public-key algorithm service function, and a storage/compression service function,
    wherein a first programmable package corresponds to the network/DPI service function, a second programmable package corresponds to the network/IPSEC service function, a third programmable package corresponds to the network/ACL service function, a fourth programmable package corresponds to the computing/DH public-key algorithm service function, and a fifth programmable package corresponds to the storage/compression service function.

2. The method according to claim 1, wherein
    the MANO is configured to store a correspondence between the programmable package and an acceleration engine partition number; and, wherein the method further comprises:
    determining, by the MANO from the correspondence between the programmable package and an acceleration engine partition number, a target partition corresponding to the target programmable package; and sending, by the MANO, the target partition to the acceleration engine in the NFVI; and, wherein running, by the acceleration engine, the target programmable package comprises:

running, by the acceleration engine, the target programmable package in the target partition.

3. The method according to claim 1, wherein the programmable package determining entity comprises a VNF and a MANO; and the VNF stores a programmable package, and a correspondence between a service function and a programmable package name; and, wherein determining, by the programmable package determining entity, the target service function that needs to be accelerated comprises:

determining, by the VNF, the target service function that needs to be accelerated;

obtaining, by the programmable package determining entity, a target programmable package corresponding to the target service function comprises:

determining, by the VNF from the correspondence between a service function and a programmable package name, a target programmable package name corresponding to the target service function, and obtaining the target programmable package corresponding to the target programmable package name from the stored programmable package; and sending, by the programmable package determining entity, the target programmable package to an acceleration engine in an NFVI comprises:

sending, by the VNF, the target programmable package to the MANO; and sending, by the MANO, the target programmable package to the acceleration engine in the NFVI.

4. The method according to claim 3, wherein the MANO is configured to store a correspondence between the programmable package and an acceleration engine partition number; and, wherein method further comprises:

determining, by the MANO from the correspondence between the programmable package and an acceleration engine partition number, a target partition corresponding to the target programmable package; and sending, by the MANO, the target partition to the acceleration engine in the NFVI; and running, by the acceleration engine, the target programmable package comprises:

running, by the acceleration engine, the target programmable package in the target partition.

5. The method according to claim 1, wherein the programmable package determining entity comprises a VNF, wherein the VNF is configured to store a programmable package, and a correspondence between a service function and a programmable package name;

determining, by the programmable package determining entity, the target service function that needs to be accelerated comprises:

determining, by the VNF, the target service function that needs to be accelerated;

obtaining, by the programmable package determining entity, the target programmable package corresponding to the target service function comprises:

determining, by the VNF from the correspondence between a service function and a programmable package name, a target programmable package name corresponding to the target service function, and obtaining the target programmable package corresponding to the target programmable package name from the stored programmable package; and sending, by the programmable package determining entity, the target programmable package to an acceleration engine in an NFVI comprises:

sending, by the VNF, the target programmable package to the acceleration engine in the NFVI.

6. A service acceleration method in a network functions virtualization (NFV) system, wherein the NFV system comprises a virtualized network function (VNF), a management and orchestration (MANO) and a network functions virtualization infrastructure (NFVI), and the method comprises:

receiving, by the MANO, a service acceleration request sent by the VNF, wherein the service acceleration request indicates a target service function that needs to be accelerated;

obtaining, by the MANO, a target programmable package corresponding to the target service function; and sending, by the MANO, the target programmable package to an acceleration engine in the NFVI, wherein the target programmable package is used by the acceleration engine to accelerate the target service function that needs to be accelerated, running, by the acceleration engine, the target programmable package to accelerate the target service function that needs to be accelerated, wherein each service function has a corresponding programmable package used for acceleration, the MANO is configured to store a programmable package, and a correspondence between a service function and a programmable package name; and, wherein obtaining, by the MANO, the target programmable package corresponding to the target service function comprises:

determining, by the MANO from the correspondence between a service function and a programmable package name, and a target programmable package name corresponding to the target service function, and obtaining the target programmable package corresponding to the target programmable package name from the stored programmable package, wherein the service function includes a network/DPI (Deep Packet Inspection) service function, a network/IPSEC (IP Security) service function, a network/ACL (Access Control List) service function, a computing/DH (Diffie-Hellman) public-key algorithm service function, and a storage/compression service function, wherein a first programmable package corresponds to the network/DPI service function, a second programmable package corresponds to the network/IPSEC service function, a third programmable package corresponds to the network/ACL service function, a fourth programmable package corresponds to the computing/DH public-key algorithm service function, and a fifth programmable package corresponds to the storage/compression service function.

7. The method according to claim 6, wherein the MANO is configured to store a correspondence between the programmable package and an acceleration engine partition number; and, wherein the method further comprises:

determining, by the MANO from the correspondence between the programmable package and an acceleration engine partition number, and a target partition corresponding to the target programmable package; and sending, by the MANO, the target partition to the acceleration engine in the NFVI, wherein the target partition enables the acceleration engine to run the target programmable package in the target partition.

8. A service acceleration system, wherein the system comprises a programmable package determining entity and a network functions virtualization infrastructure (NFVI), and the NFVI comprises an acceleration engine, wherein the programmable package determining entity is configured to: determine a target service function that needs to be accelerated, obtain a target programmable package corresponding to the target service function, and send the target programmable package to the acceleration engine in the NFVI; and the acceleration engine is configured to run the target programmable package to accelerate the target service function that needs to be accelerated, wherein each service function has a corresponding programmable package used for acceleration, the programmable package determining entity comprises a virtualized network function (VNF) and a management and orchestration (MANO), wherein the MANO is configured to store a programmable package, and a correspondence between a service function and a programmable package name;

the VNF is configured to: determine the target service function that needs to be accelerated, and send a service acceleration request to the MANO, wherein the service acceleration request indicates the target service function that needs to be accelerated; and the MANO is further configured to: determine, from the correspondence between a service function and a programmable package name, a target programmable package name corresponding to the target service function, to obtain the target programmable package corresponding to the target programmable package name from the stored programmable package, and to send the target programmable package to the acceleration engine in the NFVI, wherein the service function includes a network/DPI (Deep Packet Inspection) service function, a network/IPSEC (IP Security) service function, a network/ACL (Access Control List) service function, a computing/DH (Diffie-Hellman) public-key algorithm service function, and a storage/compression service function, wherein a first programmable package corresponds to the network/DPI service function, a second programmable package corresponds to the network/IPSEC service function, a third programmable package corresponds to the network/ACL service function, a fourth programmable package corresponds to the computing/DH public-key algorithm service function, and a fifth programmable package corresponds to the storage/compression service function.

9. The system according to claim 8, wherein the MANO is configured to:

store a correspondence between the programmable package and an acceleration engine partition number;

determine, from the correspondence between the programmable package and an acceleration engine partition number, a target partition corresponding to the target programmable package; and send the target partition to the acceleration engine in the NFVI; and the acceleration engine is configured to run the target programmable package in the target partition.

10. The system according to claim 8, wherein the programmable package determining entity comprises a VNF and a MANO; and the VNF is configured to store a programmable package, and a correspondence between a service function and a programmable package name;

the VNF is configured to: determine the target service function that needs to be accelerated, to determine, from the correspondence between a service function and a programmable package name, a target programmable package name corresponding to the target service function, to obtain the target programmable package corresponding to the target programmable package name from the stored programmable package, and to send the target programmable package to the MANO; and the MANO is configured to send the target programmable package to the acceleration engine in the NFVI.

11. The system according to claim 10, wherein the MANO is configured to:

store a correspondence between the programmable package and an acceleration engine partition number;

determine, from the correspondence between the programmable package and an acceleration engine partition number, a target partition corresponding to the target programmable package; and send the target partition to the acceleration engine in the NFVI; and the acceleration engine is specifically configured to run the target programmable package in the target partition.

12. The system according to claim 8, wherein the programmable package determining entity comprises a VNF, wherein the VNF is configured to store a programmable package, and a correspondence between a service function and a programmable package name; and the VNF is configured to: determine the target service function that needs to be accelerated, determine, from the correspondence between a service function and a programmable package name, a target programmable package name corresponding to the target service function, to obtain the target programmable package corresponding to the target programmable package name from the stored programmable package, and to send the target programmable package to the acceleration engine in the NFVI.

13. A service acceleration apparatus in a network functions virtualization (NFV) system, wherein the apparatus comprises:

a receiving module, configured to receive a service acceleration request sent by a virtualized network function (VNF) in the NFV system, wherein the service acceleration request indicates a target service function that needs to be accelerated;

a processing module, configured to obtain a target programmable package corresponding to the target service function; and a sending module, configured to send the target programmable package to an acceleration engine in an NFVI in the NFV system, wherein the target programmable package is used by the acceleration engine to accelerate the target service function that needs to be accelerated, wherein the acceleration engine runs the target programmable package to accelerate the target service function that needs to be accelerated, wherein each service function has a corresponding programmable package used for acceleration, wherein the service acceleration apparatus is configured to store a programmable package, and a correspondence between a service function and a programmable package name; and the processing module is configured to: determine, from the correspondence between a service function and a programmable package name, a target programmable package name corresponding to the target service function, and obtain the target programmable package corresponding to the target programmable package name from the stored programmable package, wherein the service function includes a network/DPI (Deep Packet Inspection) service function, a network/IPSEC (IP Security) service function, a network/ACL (Access Control List) service function, a computing/DH (Diffie-Hellman) public-key algorithm service function, and a storage/compression service function, wherein a first programmable package corresponds to the network/DPI service function, a second programmable package corresponds to the network/IPSEC service function, a third programmable package corresponds to the network/ACL service function, a fourth programmable package corresponds to the computing/DH public-key algorithm service function, and a fifth programmable package corresponds to the storage/compression service function.

14. The apparatus according to claim 13, wherein the service acceleration apparatus is configured to store a correspondence between the programmable package and an acceleration engine partition number;

the processing module is further configured to determine, from the correspondence between the programmable package and an acceleration engine partition number, a target partition corresponding to the target programmable package; and the sending module is further configured to send the target partition to the acceleration engine in the NFVI, wherein the target partition enables the acceleration engine to run the target programmable package in the target partition.

15. A server, wherein the server is located in a network functions virtualization, NFV, system, and the server comprises:

an I/O interface, a processor, and a memory that are connected to each other;

the memory is configured to store program code;

the processor invokes the program code in the memory to perform the following operations:

receiving, by using the I/O interface, a service acceleration request sent by a virtualized network function (VNF) in the NFV system, wherein the service acceleration request indicates a target service function that needs to be accelerated; obtaining a target programmable package corresponding to the target service function; and sending the target programmable package to an acceleration engine in an NFVI in the NFV system, wherein the target programmable package is used by the acceleration engine to accelerate the target service function that needs to be accelerated, wherein the acceleration engine runs the target programmable package to accelerate the target service function that needs to be accelerated, wherein each service function has a corresponding programmable package used for acceleration, wherein the service acceleration engine is configured to store a programmable package, and a correspondence between a service function and a programmable package name; and the processor is configured to: determine, from correspondence between a service function and a programmable package name, a target programmable package name corresponding to the target service function, and obtain the target programmable package corresponding to the target programmable package name from the stored programmable package, wherein the service function includes a network/DPI (Deep Packet Inspection) service function, a network/IPSEC (IP Security) service function, a network/ACL (Access Control List) service function, a computing/DH (Diffie-Hellman) public-key algorithm service function, and a storage/compression service function, wherein a first programmable package corresponds to the network/DPI service function, a second programmable package corresponds to the network/IPSEC service function, a third programmable package corresponds to the network/ACL service function, a fourth programmable package corresponds to the computing/DH public-key algorithm service function, and a fifth programmable package corresponds to the storage/compression service function.

16. A non-transitory, computer-readable medium having processor-executable instructions stored thereon, which when executed by a processor, cause the processor to implement a service acceleration method including the following operations:

receiving a service acceleration request sent by a virtualized network function (VNF), wherein the service acceleration request indicates a target service function that needs to be accelerated;

obtaining a target programmable package corresponding to the target service function; and sending the target programmable package to an acceleration engine in an NFVI in an NFV system, wherein the target programmable package is used by the acceleration engine to accelerate the target service function that needs to be accelerated, wherein the acceleration engine runs the target programmable package to accelerate the target service function that needs to be accelerated, wherein each service function has a corresponding programmable package used for acceleration, wherein the service acceleration engine is configured to store a programmable package, and a correspondence between a service function and a programmable package name; and the processor is configured to: determine, from correspondence between a service function and a programmable package name, a target programmable package name corresponding to the target service function, and obtain the target programmable package corresponding to the target programmable package name from the stored programmable package, wherein the service function includes a network/DPI (Deep Packet Inspection) service function, a network/IPSEC (IP Security) service function, a network/ACL (Access Control List) service function, a computing/DH (Diffie-Hellman) public-key algorithm service function, and a storage/compression service function, wherein a first programmable package corresponds to the network/DPI service function, a second programmable package corresponds to the network/IPSEC service function, a third programmable package corresponds to the network/ACL service function, a fourth programmable package corresponds to the computing/DH public-key algorithm service function, and a fifth programmable package corresponds to the storage/compression service function.

* * * * *